(12) United States Patent
Batra et al.

(10) Patent No.: US 7,372,890 B2
(45) Date of Patent: May 13, 2008

(54) METHODS AND SYSTEMS FOR DETECTING AND MITIGATING INTERFERENCE FOR A WIRELESS DEVICE

(75) Inventors: Anuj Batra, Dallas, TX (US); Jaiganesh Balakrishnan, Karnataka (IN); Srinivas Lingam, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/340,876

(22) Filed: Jan. 27, 2006

(65) Prior Publication Data
US 2006/0171445 A1 Aug. 3, 2006

Related U.S. Application Data

(60) Provisional application No. 60/648,337, filed on Jan. 28, 2005.

(51) Int. Cl.
*H04B 1/00* (2006.01)
(52) U.S. Cl. .............. 375/130; 375/132; 375/144; 375/148; 375/346; 375/349; 375/350
(58) Field of Classification Search ............. 375/130, 375/136, 148, 350
See application file for complete search history.

(56) References Cited

U.S. PATENT DOCUMENTS

| | | | | |
|---|---|---|---|---|
| 5,715,279 | A * | 2/1998 | Laakso et al. | 375/224 |
| 6,163,164 | A * | 12/2000 | Inoue | 326/21 |
| 6,426,983 | B1 * | 7/2002 | Rakib et al. | 375/346 |
| 6,760,317 | B1 | 7/2004 | Honkanen et al. | |
| 6,798,854 | B2 * | 9/2004 | Kolze et al. | 375/350 |
| 6,954,489 | B2 * | 10/2005 | Svensson et al. | 375/150 |
| 7,046,644 | B1 * | 5/2006 | Lappetelainen | 370/329 |
| 2002/0118730 | A1 | 8/2002 | Svensson et al. | |
| 2002/0136268 | A1 * | 9/2002 | Gan et al. | 375/133 |
| 2003/0179821 | A1 * | 9/2003 | Lusky et al. | 375/224 |
| 2004/0127259 | A1 * | 7/2004 | Matsunaga | 455/560 |
| 2004/0259589 | A1 | 12/2004 | Bahl et al. | |
| 2005/0255878 | A1 * | 11/2005 | Leinonen et al. | 455/552.1 |

* cited by examiner

*Primary Examiner*—Curtis Odom
(74) *Attorney, Agent, or Firm*—Steven A. Shaw; W. James Brady; Frederick J. Telecky, Jr.

(57) ABSTRACT

In at least some embodiments, a method for mitigating interference between an Ultra Wideband (UWB) device and a non-UWB device is provided. The method includes, dynamically determining if a frequency channel associated with the non-UWB device is being used. If the frequency channel is being used, the method adjusts a UWB frequency band used for UWB signal transmission.

15 Claims, 5 Drawing Sheets

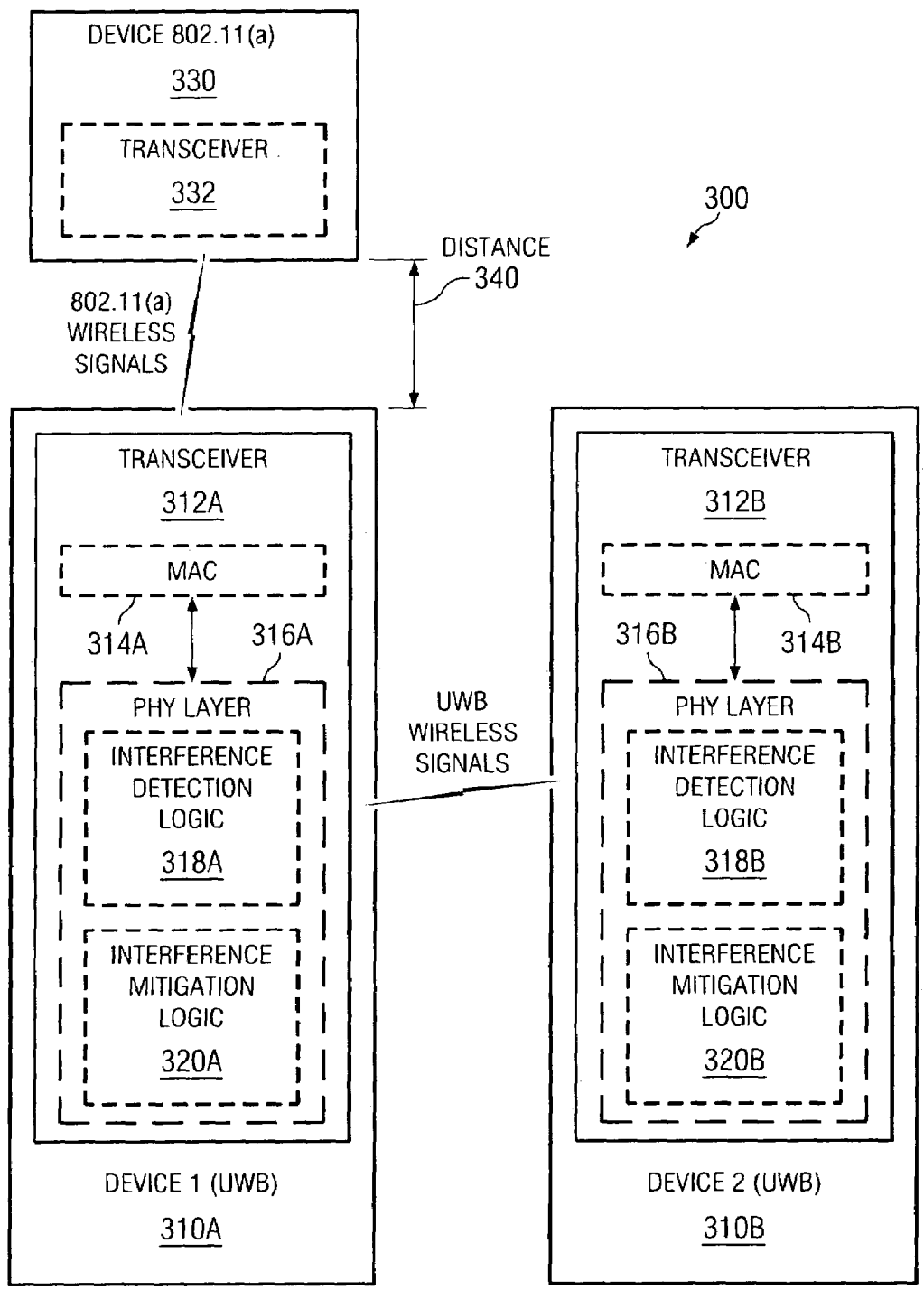

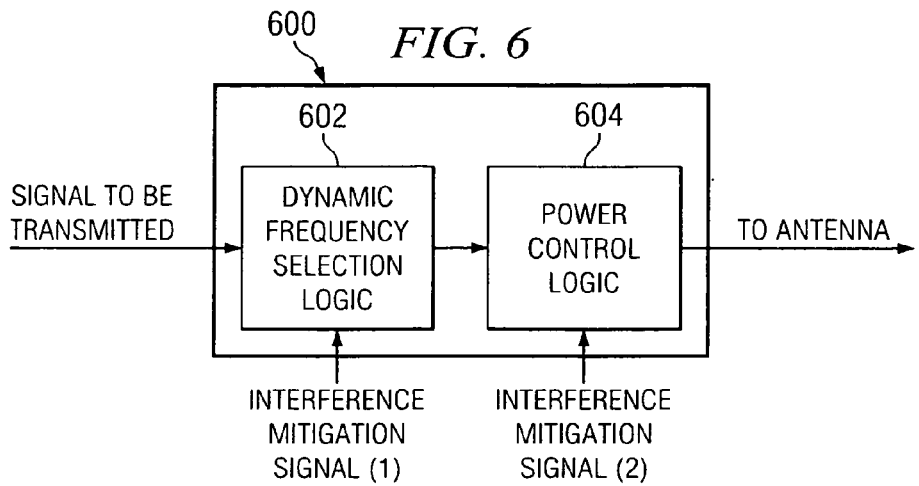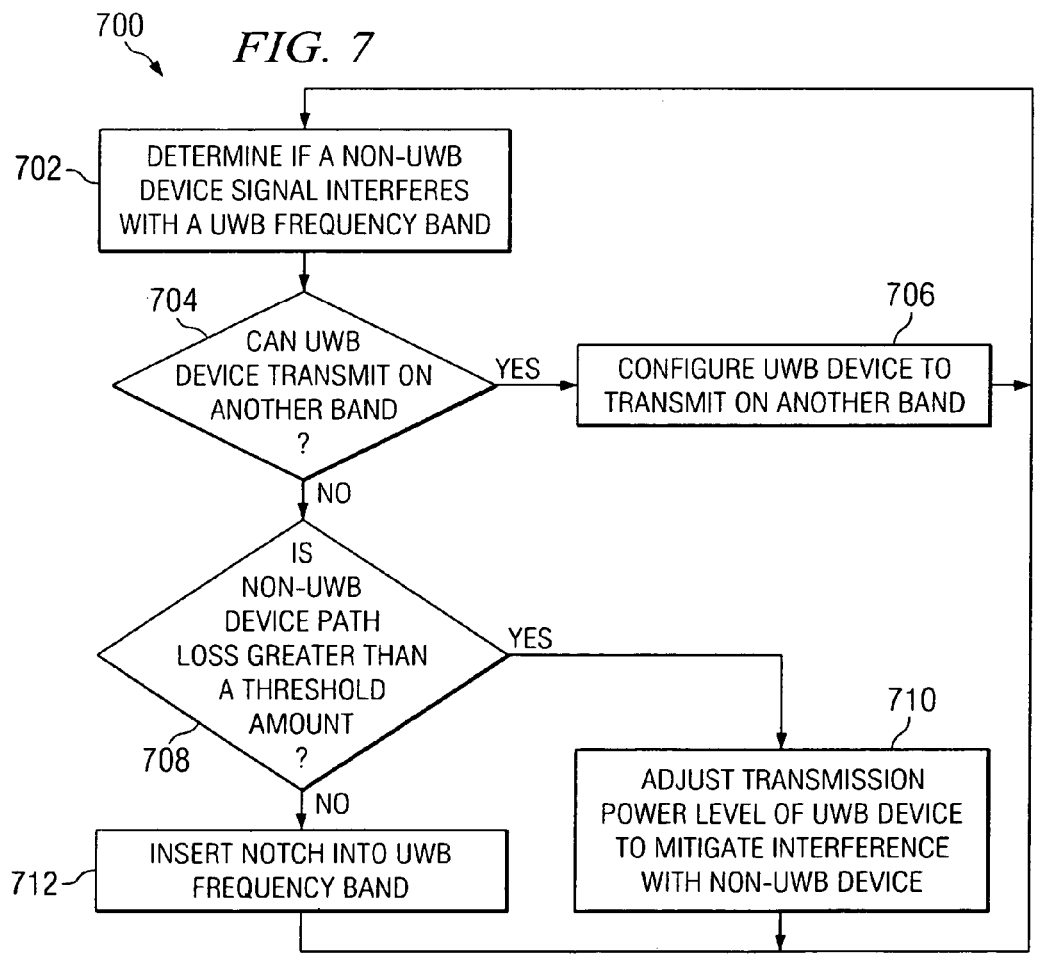

METHODS AND SYSTEMS FOR DETECTING AND MITIGATING INTERFERENCE FOR A WIRELESS DEVICE

CROSS-REFERENCE TO RELATED APPLICATIONS

This application is a non-provisional application claiming priority to U.S. Pat. App. Ser. No. 60/648,337, entitled "Cognitive Radio Techniques for Multi-band OFDM Systems", filed on Jan. 28, 2005. The above-referenced application is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to wireless communication systems, and more particularly, but not by way of limitation, to detecting and handling interference between different wireless communication systems.

BACKGROUND

In order for electronic devices to communicate, a wireless or wired protocol (i.e., standard) defines hardware and software parameters that enable the devices to send, receive, and interpret data. The Federal Communications Commission (FCC) has allocated different frequency ranges (spectrums) for different wireless protocols. For example, the 802.11(a) protocol provided by the Institute of Electrical and Electronics Engineers (IEEE) specifies operating in a frequency range from 4.9-5.85 GHz (part of the Unlicensed National Information Infrastructure (U-NII) band). Also, the Worldwide Interoperability of Microwave Access (WiMAX) protocol specifies operating in frequency range from 3.3-3.8 GHz and from 5.4-5.825 GHz. More recently, the Ultra Wideband (UWB) protocol specifies operating in a frequency range from 3.1-10.6 GHz. The UWB protocol is based on Multi-band Orthogonal Frequency Division Multiplexing (OFDM) and is defined by the ECMA-368 specification provided by the WiMedia Alliance.

Because the UWB frequency range cuts across the frequency ranges specified for other protocols such as the 802.11(a) and WiMAX protocols, the possibility of interference between UWB-based devices and other devices (e.g., 802.11(a)-based devices or WiMAX-based devices) exists. Obviously, preventing or reducing interference between the different devices is desirable.

SUMMARY

In at least some embodiments, a device for wireless communication is provided. The device comprises a receiver configured to receive wireless signals within at least one predetermined frequency band and a transmitter configured to transmit wireless signal within the at least one frequency band. The device also comprises interference detection logic coupled to the receiver, the interference detection logic is configured to detect interfering signals being transmitted within the at least one frequency band. The device also comprises interference mitigation logic coupled to the interference detection logic and the transmitter. If the interference detection logic asserts an interference detected signal to the interference mitigation logic, the interference mitigation logic causes the transmitter to implement a technique that mitigates interference.

In at least some embodiments, a Method for mitigating interference between an Ultra Wideband (UWB) device and a non-UWB device is provided. The method includes, dynamically determining if a frequency channel associated with the non-UWB device is being used. If the frequency channel is being used, the method adjusts a UWB frequency band, used for UWB signal transmission.

BRIEF DESCRIPTION OF THE DRAWINGS

For a detailed description of various embodiments of the invention, reference will now be made to the accompanying drawings in which:

FIG. 3 illustrates a system in accordance with embodiments of the disclosure;

FIG. 6 illustrates a block diagram of interference mitigation logic in accordance with embodiments of the disclosure; and FIG. 7 illustrates a method in accordance with embodiments of the disclosure.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection

DETAILED DESCRIPTION

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Electronic devices that communicate wirelessly implement a variety of techniques to prepare, send, receive, and recover data. For example, data preparation techniques may include data scrambling, error correction coding, interleaving, data packet formatting, and/or other techniques. The data to be transmitted is converted into blocks of data (i.e., bits) transmitted as information symbols. Each information symbol is associated with a constellation of complex amplitudes.

If data communication is wireless, one or more antennas "pick up" the wireless signal, after which data is recovered by sampling the received signal and decoding each information symbol. To recover data, a receiving device may implement techniques such as signal amplification, digitization, sample rate conversion, equalization, demodulation, de-interleaving, de-coding, and/or de-scrambling.

Figure 1:
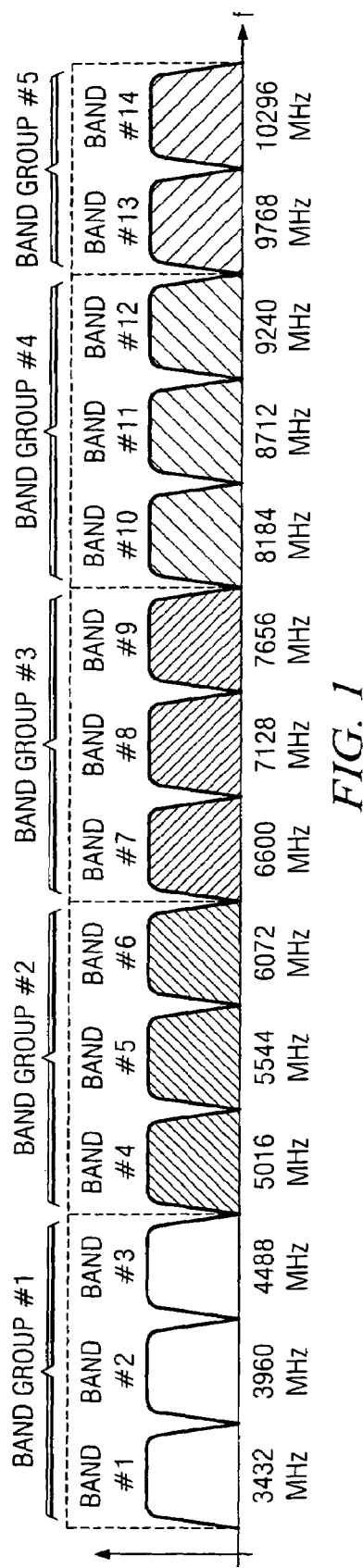
FIG. 1 illustrates a spectrum of frequency bands associated with the Ultra Wideband (UWB) protocol.

As previously mentioned, the Federal Communications Commission (FCC) has allocated different frequency ranges (spectrums) for different wireless protocols. FIG. 1 illustrates a spectrum of frequency bands associated with the Ultra Wideband (UWB) protocol. As shown in FIG. 1, the UWB spectrum ranges from 3.1-10.6 GHz with band groups 1-5. Each band group is associated with a plurality of frequency bands and each frequency band has a bandwidth approximately 528 MHz wide. For example, the band group 1 is associated with a frequency band 1 centered at 3.432 GHz, a frequency band 2 centered at 3.960 GHz and a frequency band 3 centered at 4.488 GHz. The band group 2 is associated with a frequency band 4 centered at 5.016 GHz, a frequency band 5 centered at 5.544 GHz and a frequency band 6 centered at 6.072 GHz. The band group 3 is associated with a frequency band 7 centered at 6.600 GHz, a frequency band 8 centered at 7.128 GHz and a frequency band 9 centered at 7.656 GHz. The band group 4 is associated with a frequency band 10 centered at 8.184 GHz, a frequency band 11 centered at 8.712 GHz and a frequency band 12 centered at 9.24 GHz. The band group 5 is associated with a frequency band 13 centered at 9.768 GHz and a frequency band 14 centered at 10.296 GHz.

Figure 2A:
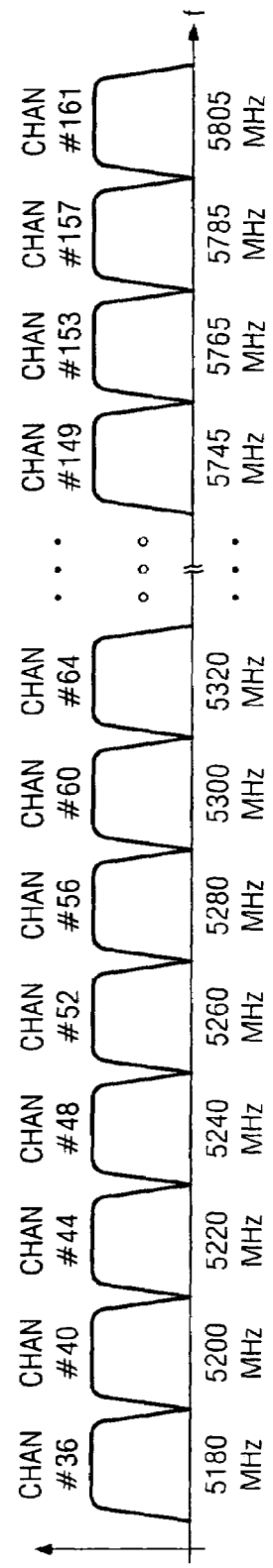
FIG. 2A illustrates a spectrum of frequency channels associated with the Institute of Electrical and Electronics Engineers (IEEE) 802.11(a) protocol.

FIG. 2A illustrates a spectrum of frequency channels associated with the Institute of Electrical and Electronics Engineers (IEEE) 802.11(a) protocol. As shown in FIG. 2A, the 802.11(a) spectrum ranges from 4.90-5.85 GHz with frequency channels having a bandwidth of approximately 20 MHz. In FIG. 2A, frequency channels 36-161 are shown. Comparing the frequency channels of the 802.11(a) spectrum (in FIG. 2A) with the frequency bands of the UWB spectrum (in FIG. 1), the frequency channels 36-52 of the 802.11 spectrum overlap with the frequency band 4 of the UWB spectrum and the frequency channels 60-157 of the 802.11(a) overlap with the frequency band 5 of the UWB spectrum. Also, the frequency channel 56 of the 802.11(a) spectrum straddles the frequency bands 4 and 5 of the UWB spectrum and the frequency channel 161 of the 802.11(a) spectrum straddles the frequency bands 5 and 6 of the UWB spectrum.

For convenience, embodiments of the disclosure describe detecting and mitigating interference between UWB-based devices and 802.11(a)-based devices. However, alternative embodiments could detect and mitigate interference between UWB-based devices and other devices (e.g., WiMAX-based devices, cordless phones or other devices) using the same principles described herein.

Figure 2B:
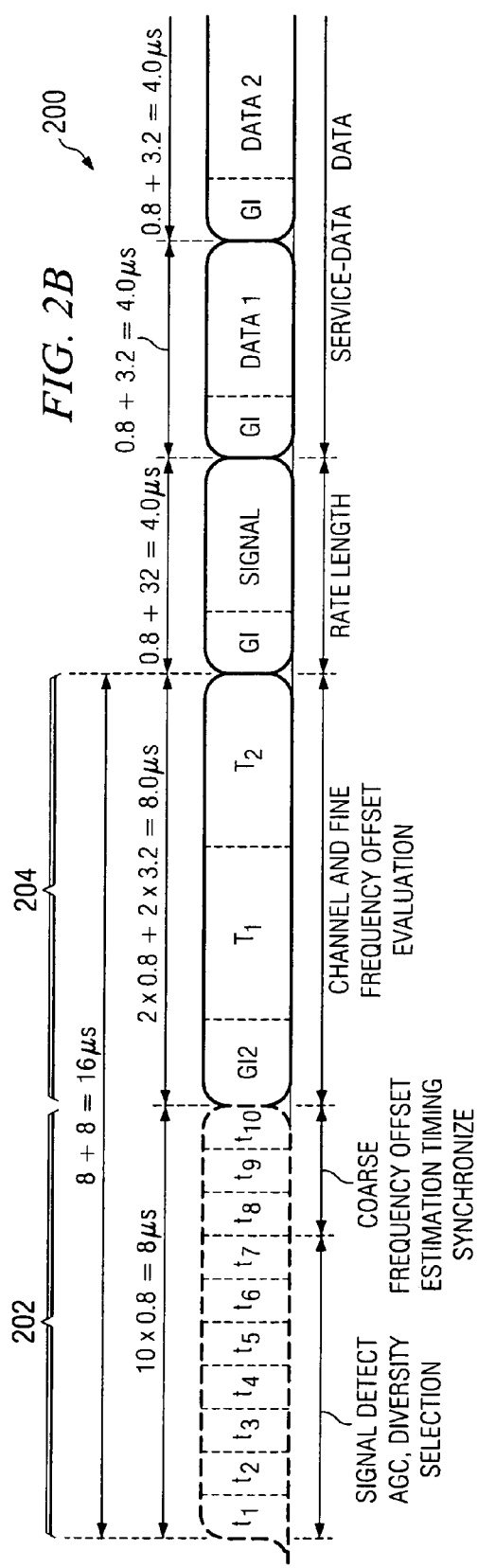
FIG. 2B illustrates an IEEE 802.11(a) protocol data packet.

FIG. 2B illustrates an IEEE 802.11(a) protocol data packet 200. The data packet 200 comprises a short preamble 202 and a long preamble 204. The short preamble 202 is composed of ten repetitions ($t_1$-$t_{10}$) of a known signal, where each repetition is 0.8 µs in length. The long preamble 204 is composed of a guard interval (GI2) and two repetitions (T1-T2) of a known signal, where each repetition is 3.2 µs in length. In some embodiments, a UWB-based device detects interference from an 802.11(a)-based device by correlating samples of an incoming signal with samples of known short preamble 202 values and/or known long preamble 204 values.

FIG. 3 illustrates a system 300 in accordance with embodiments of the disclosure. As shown in FIG. 3, the system 300 comprises a first UWB-based device 310A and a second UWB-based device 310B. The first UWB-based device 310A includes a transceiver 312A having a media access controller (MAC) 314A and a PHY layer 316A. The transceiver 312A could also have "higher" layers. The second UWB-based device 310B also includes a transceiver 312B having a MAC 314B and a PHY layer 316B. The transceiver 312B could also have "higher" layers. In at least some embodiments, a PHY layer, MAC and high layers provide standardized functions defined for the UWB protocol in ECMA-368. For clarity, only the components of the first UWB-based device 310A are described in greater detail. However, the same discussion would apply to the components of the second UWB-based device 310B.

In order for the device 310A to communicate wirelessly, the PHY layer 316A and MAC 314A perform several functions such as preparing, transmitting, receiving, and decoding signals. In some embodiments, the PHY layer 316A provides encoding, decoding, modulation, and/or demodulation of information symbols for the device 310A based on Multi-band Orthogonal Frequency Division Multiplexing (OFDM) techniques. As shown, the PHY layer 316A also implements interference detection logic 318A and interference mitigation logic 320A.

The interference detection logic 318A detects if a non-UWB device is transmitting signals in a UWB frequency band. For example, an 802.11(a)-based device 330 may comprise a transceiver 332 that transmits 802.11(a) signals in a frequency band used by the UWB-based devices 310A and 310B. In some embodiments, the interference detection logic 318A also determines the strength of interfering signals. The strength of interfering signals is proportional to the original transmission power level of the interfering signals as well as the distance 340 between the device that transmits the interfering signals (e.g., the 802.11(a)-based device 330) and the device that detects the interfering signals (e.g., the first UWB-based device 310A).

To detect interfering signals that straddle different UWB frequency bands (as previously described for 802.11(a) frequency channels 56 and 157), some embodiments of the interference detection logic 318A integrate the detected interference over multiple UWB frequency bands. For example, the interference detection logic 318A could integrate the detected interference in frequency bands 4 and 5 to more accurately determine if 802.11(a) channel 56 is being used. Also, the interference detection logic 318A could integrate the detected interference in frequency bands 5 and 6 to more accurately determine if 802.11(a) channel 157 is being used. Since the 802.11(a) frequency channels 56 and 157 straddle UWB frequency bands, these frequencies may correspond to UWB null tones and/or lower transmit power guard tones. In such case, interference between UWB-based devices and 802.11(a)-based devices that arise due to frequency channels 56 or 157 may be negligible.

Although the 802.11(a) wireless signals are described as interfering with the UWB-based devices 310A and 310B, it should be understood that UWB wireless signals could interfere with 802.11(a)-based devices such as the 802.11 (a)-based device 330. The interference could be mutual or exclusive depending on the technology implemented by the different devices. In either case, the interference detection logic 318A is configured to detect interference and to notify the interference mitigation logic 320A accordingly.

The interference mitigation logic 320A prevents or reduces the interference based on one or more techniques such as dynamic frequency selection and dynamic transmit power control. To implement dynamic frequency selection, the interference mitigation logic 320A causes the transceiver 312A to shift transmission from one frequency band to another frequency band (away from the frequency of interfering signal). The shift could be to a higher frequency band or a lower frequency band and would be determined by the capabilities of the UWB devices 310A and 310B. For example, if the interference detection logic 318A detects interference in frequency band 4, but not in frequency band 5, the interference mitigation logic 320A may direct the transceiver 312A to transmit signals in the frequency band 5 instead of frequency band 4. Alternatively, if the interference detection logic 318A detects interference in frequency band 5, but not in frequency band 4, the interference mitigation logic 320A may direct the transceiver 312A to transmit signals in the frequency band 4 instead of frequency band 5.

Rather than cause the transceiver 312A to shift to another frequency band, the interference mitigation logic 320A could cause the transceiver 312A to drop a frequency band altogether (dropping one of a plurality of available frequency bands would still allow communication). Alternatively, the interference mitigation logic 320A could insert notches (wedges) into a UWB frequency band that experiences interference. The notches would reduce the usable bandwidth of a UWB frequency band, but would enable the remaining bandwidth to be used for UWB signal transmission. For example, if the interference to a UWB frequency band is caused by an 802.11(a)-based device, the notch could be sized at approximately 20 MHz (the bandwidth of each 802.11(a) channel as shown in FIG. 2A) plus a few MHz on each side of the notch. Since each UWB frequency band has a bandwidth of approximately 528 MHz, inserting notches of approximately 20 MHz is acceptable in some embodiments.

In some embodiments, both shifting to another UWB frequency band and inserting notches into a UWB frequency band can be implemented. If both of these techniques are determined to be available options for mitigating interference, some embodiments may be configured to shift frequency bands before inserting notches into a frequency band. In such embodiments, inserting notches into a frequency band is implemented if shifting frequency bands is no longer a viable option. Again, if both of these techniques are determined to be available options for mitigating interference, other embodiments may be configured to insert notches into a frequency band before shifting frequency bands. In such embodiments, shifting frequency bands is implemented if inserting notches into a frequency band is no longer a viable option. Also, in some embodiments, the transceiver 312A is able to hop between three frequency bands using a predefined sequence. If interference is detected in a frequency band and inserting a notch is not a viable option, the frequency band can be dropped by adjusting the hopping sequence to skip the band experience interference.

To implement dynamic transmit power control, the interference mitigation logic 320A receives information regarding the strength of the interfering signal at the device 310A and the original transmission strength of the interfering signal from the 802.11(a)-based device 330. The interference mitigation logic 320A can direct the transceiver 312A to adjust the power level of UWB signals being transmitted so that the second UWB-based device 310B is able to receive the UWB signals, but the 802.11(a)-based device 330 does not receive the UWB signals or receives UWB signals that are negligibly small (i.e., the power level of UWB signals being transmitted can be controlled to prevent interference with other devices such as the 802.11(a) device 330).

In some embodiments, only dynamic frequency selection is implemented. In alternative embodiments, only dynamic transmit power control is implemented. In still other embodiments, both dynamic frequency selection and dynamic transmit power control are implemented. In such embodiments, the implementation of dynamic frequency selection and dynamic transmit power control can be prioritized. For example, if both dynamic frequency selection and dynamic transmit power control are determined to be available options for mitigating interference, some embodiments may be configured to implement dynamic frequency selection and later, if needed, to implement dynamic transmit power control. Alternatively, some embodiments may be configured to implement dynamic transmit power control and later, as needed, to implement dynamic frequency selection.

In some embodiments, the UWB-based device 310A is configured in a default setting and adjusts, as needed, to handle interference from other devices (e.g., the 802.11(a)-based device 330). If interference from another device is not detected for a predetermined period of time, previous adjustments to the UWB frequency band (e.g., band shifting or adding notches) and/or adjustments to the transmission power level are no longer needed. Accordingly, default settings that were affected by the non-UWB device can be restored. Instead of restoring default settings, the UWB-based device 310A could return to a modified setting (not the default setting) if interference from another device is not detected for a predetermined period of time. The UWB-based device 310A is configured to continuously or periodically monitor interference based on the interference detection logic 318A and respond accordingly based on the interference mitigation logic 320A. This is true even if the interference is dynamic (i.e., increasing, decreasing, or shifting frequency) and involves multiple signals.

Figure 4A:
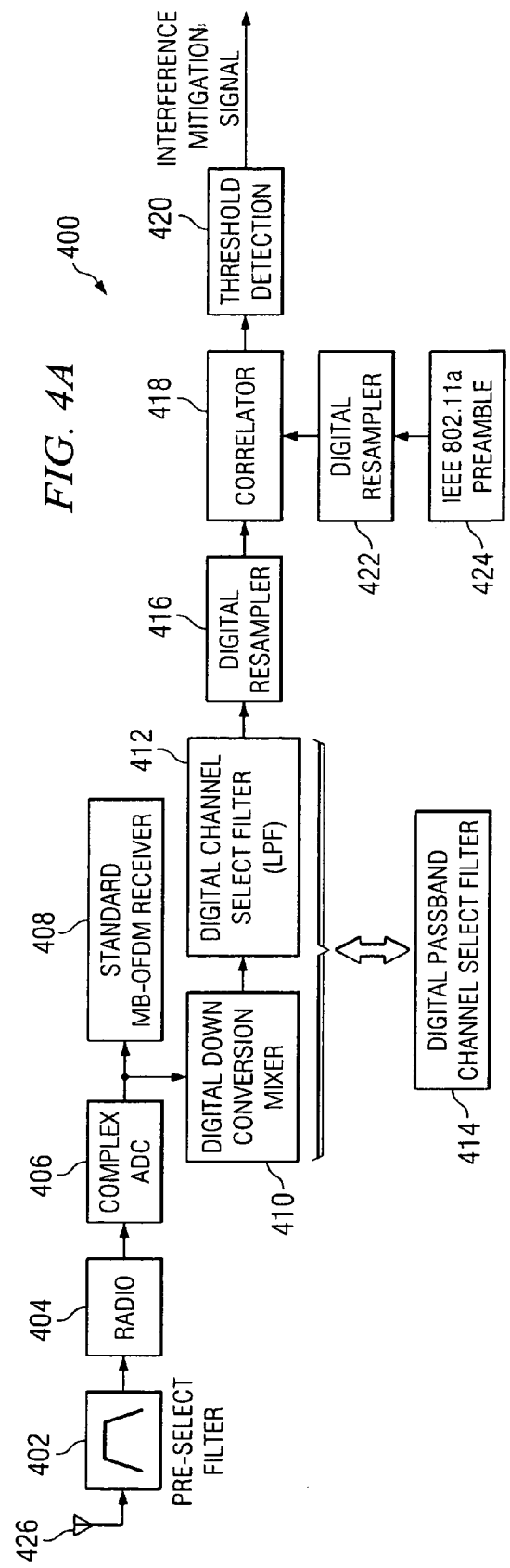
FIG. 4A illustrates a block diagram of a receiver in accordance with embodiments of the disclosure.

FIG. 4A illustrates a block diagram of a receiver 400 in accordance with embodiments of the disclosure. In at least some embodiments, the receiver 400 is part of a UWB-based device's transceiver (e.g., the transceiver 312A) and enables detection of an 802.11(a) signal in the time domain. As shown in FIG. 4, the receiver 400 comprises an antenna 426 coupled to a pre-select filter 402. The pre-select filter 402 filters the incoming signal so that only signal energy within a predetermined frequency range is forwarded to a radio amplifier 404. The radio amplifier 404 provides an amplified signal to a complex analog-to-digital (ADC) converter 406 that outputs both real and imaginary ("j") signal samples in digital form. The digital samples are forwarded to standard multi-band OFDM receiver logic 408. For example, the standard multi-band OFDM receiver logic 408 may comprise components such as a down sampler, Fast Fourier Transform logic, a frequency equalizer, a constellation de-mapper and a decoder.

To detect when a received signal is an interfering 802.11 (a) signal, the receiver 400 implements logic to detect the presence of an 802.11(a) packet. This can be done without decoding the packet. In some embodiments, the digital samples from the complex ADC converter 406 are forwarded to a digital down conversion mixer 410 and a digital channel select filter 412. The digital down conversion mixer 410 mixes the received samples with the center frequency of a particular 802.11(a) channel. In some embodiments, digital mixing comprises multiplying samples of the received signal with a discrete complex exponential. This mixing process centers the samples of the received signal around a baseband or direct current (DC). The digital channel select filter 412 may comprise a low-pass filter. For example, the low-pass filter can be pre-computed and stored in a memory of the digital channel select filter 412. In alternative embodiments, a digital bandpass channel select filter 414 can be used instead of the digital down conversion mixer 410 and the digital channel select filter 412.

After passing through the digital down conversion mixer 410 and the digital channel select filter 412 (or after passing through the digital bandpass channel select filter 414) samples associated with a particular frequency channel of the incoming signal are compared to samples of a known IEEE 802.11 preamble 424. As shown, the output from the digital down conversion mixer 410 and the digital channel select filter 412 (or the digital bandpass channel select filter 414) is provided to a digital resampler 416, which provides samples at a sample rate that is approximately a multiple of the 802.11(a) channel bandwidth of 20 MHz. Similarly, the digital resampler 422 provides samples of the IEEE 802.11 (a) preamble 424 at a sample rate that is approximately a multiple of the 802.11(a) channel bandwidth of 20 MHz. In alternative embodiments, the 802.11(a) preamble samples used with the correlator 418 are pre-stored (e.g., in a register) rather than calculated "on-the-fly". In such case, at least the digital resampler 422 would not be needed.

An 802.11(a) packet can be detected by correlating samples of the incoming signal with known sample values for the short preamble 202 and/or the long preamble 204 of an 802.11(a) data packet 200. As shown, the correlator 418 compares the outputs from the digital resamplers 416 and 422. The amount of correlation between the incoming signal samples and the samples based on the known preamble values is determined by the correlator 418, which forwards the results of the correlation to a threshold detection block 420. If the amount of correlation is greater than a threshold value, the threshold detection logic 420 asserts an interference mitigation signal. In some embodiments, the threshold detection logic 420 asserts the interference mitigation signal if the correlator 420 outputs a predetermined correlation pattern such as multiple consecutive peaks (indicating the repetition of known signals for the short preamble 202 or the long preamble 204). The interference mitigation signal is used to prevent or mitigate interference between a UWB-based device that implements the receiver 400 (e.g., the first UWB-based device 310A) and other devices.

Figure 4B:
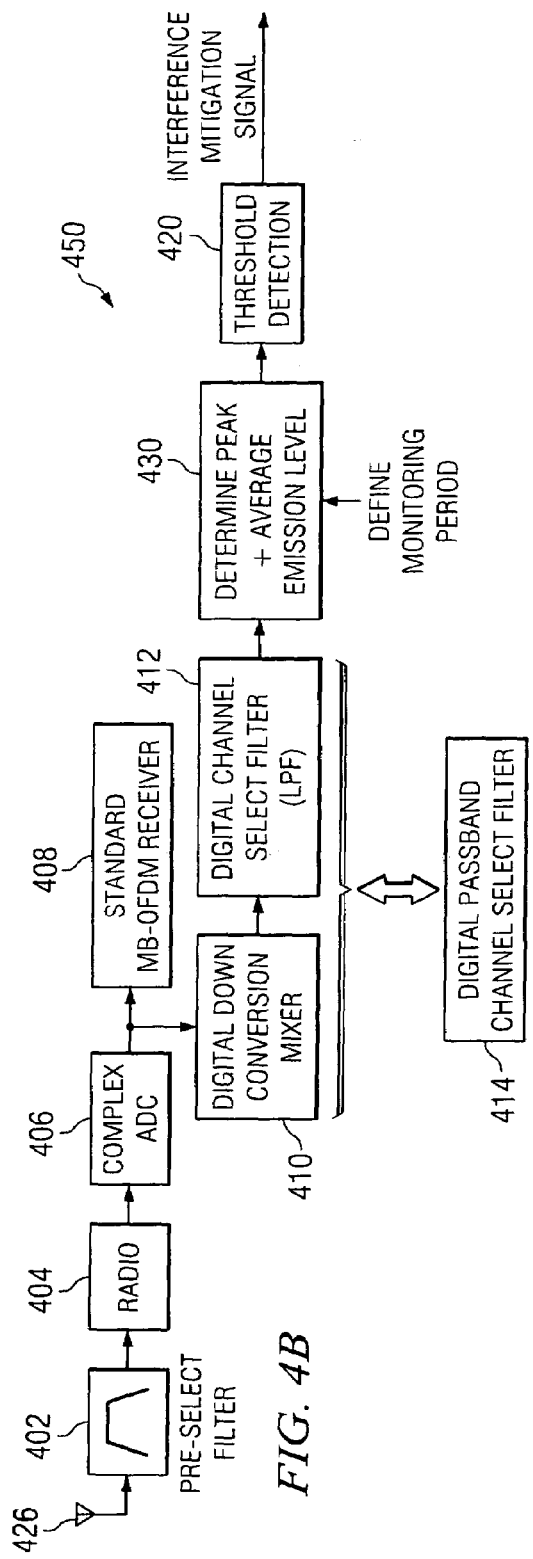
FIG. 4B illustrates a block diagram of another receiver in accordance with alternative embodiments of the disclosure.

FIG. 4B illustrates a block diagram of another receiver 450 in accordance with alternative embodiments of the disclosure. In at least some embodiments, the receiver 450 is part of a UWB-based device's transceiver (e.g., the transceiver 312A) and enables detection of an 802.11(a) signal in the time domain. Rather than detecting an 802.11 (a) packet by correlating a received signal with known patterns of an 802.11(a) preamble (as in FIG. 4A), the receiver 450 of FIG. 4B monitors the strength of the emissions level to detect interfering signals.

To measure the strength of emission levels, the receiver 450 implements determine peak and average emission level (DPAAEL) logic 430. In some embodiments, the DPAAEL logic 430 is implemented after the digital down conversion mixer 410 and the digital channel select filter 412 (or after a digital bandpass channel select filter 414). As shown, the DPAAEL logic 430 receives a programmable define monitoring period signal that enables a user to specify an interference monitoring period (IMP). Because 802.11(a) is a packet-based system, an interfering packet may not be "on-air" during the entire duration of interference measurement. To prevent underestimating an emission level of an interfering signal, some embodiments define the IMP as half the duration of the shortest 802.11(a) packet. For example, the IMP could be set to 22 µs based on the length of a request-to-send/clear-to-send (RTS/CTS) packet transmitted at a base rate of 6 Mbits/sec. The RTS/CTS would include a short preamble, a long preamble, a signature (SIG) field, a SERVICE field and an acknowledge (ACK) payload.

While 22 µs is used as the IMP duration in one embodiment, other IMP durations are possible. For example, some embodiments may select the IMP duration based on a "quiet" period within a superframe. The ECMA-368 specification allows quiet periods within superframes to be defined. If it is known that a quiet period is coming up, the length of the IMP could be adjusted to the length of the quiet period. Thus, the IMP duration could be adjusted based on location within a superframe. In at least some embodiments, the quiet period would be a multiple of the "slot time" within the superframe.

To determine the average emission level for a frequency band of interest, the DPAAEL logic 430 collects data for consecutive IMPs. Additionally or alternatively, the DPAAEL logic 430 determines the peak emission level for one or more IMPs. The peak emission level can be used as an estimate of the maximum transmission power of the interfering device (e.g., the 802.11(a)-based device 330).

As shown, the DPAAEL logic 430 provides an output (e.g., the average emission level or the peak emission level) to the threshold detection logic 432. If the average emission level is greater than a threshold value, the threshold detection logic 432 asserts an interference mitigation signal. Again, the interference mitigation signal is used to prevent or mitigate interference between a UWB-based device that implements the receiver 450 (e.g., the first UWB-based device 310A) and other devices.

Figure 5:
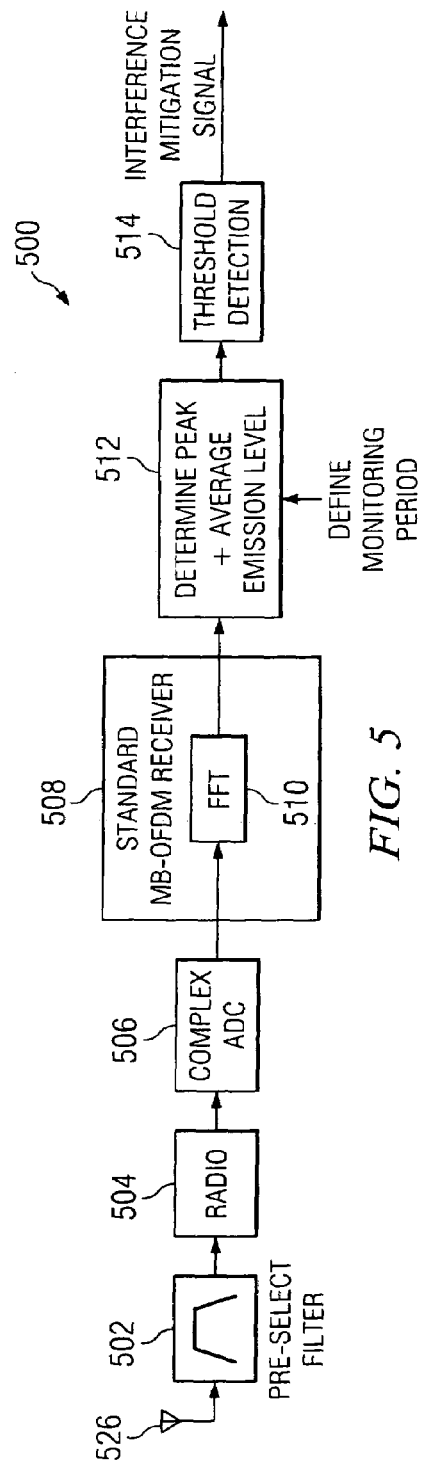
FIG. 5 illustrates another block diagram of another receiver in accordance with alternative embodiments of the disclosure.

FIG. 5 illustrates another block diagram of another receiver 500 in accordance with alternative embodiments of the disclosure. In at least some embodiments, the receiver 500 is part of a UWB-based device's transceiver (e.g., the transceiver 312A) and enables detection of an 802.11(a) signal in the frequency domain. As shown in FIG. 5, the receiver 500 comprises an antenna 526 coupled to a pre-select filter 502. The pre-select filter 502 filters the incoming signal so that only signal energy within a predetermined frequency range is forwarded to a radio amplifier 504. The radio amplifier 504 provides an amplified signal to a complex analog-to-digital (ADC) converter 506 that outputs both real and imaginary ("j") signal samples in digital form. The digital samples are forwarded to standard multi-band OFDM receiver logic 508. For example, the standard multi-band OFDM receiver logic 508 may comprise components such as a down sampler, Fast Fourier Transform logic, a frequency equalizer, a constellation de-mapper and a decoder.

As shown in FIG. 5, an FFT 510 of the multi-band OFDM receiver logic 508 receives samples from the complex ADC 506. The FFT 510 extracts frequency spectrum information from the incoming signal samples and forwards the information to DPAAEL logic 512. In at least some embodiments, the DPAAEL logic 512 receives a programmable define monitoring period signal that enables a user to specify an interference monitoring period (IMP). The DPAAEL logic 512 averages the energy in each frequency bin (e.g., 4.125 MHz wide) over the duration of an IMP. For example, if the IMP is 22 µs, the DPAAEL logic 512 would average over 70 multi-band OFDM symbols. In some embodiments, the DPAAEL logic 512 estimates the emission level in an 802.11(a) channel for each IMP by averaging over four or five adjacent frequency bins (e.g., 4*4.125 MHz=16.5 MHz or 5*4.125 MHz=20.625 MHz).

While 22 µs is used as the IMP duration in one embodiment, other IMP durations are possible. For example, some embodiments may select the IMP duration based on a "quiet" period within a superframe. The ECMA-368 specification allows quiet periods within superframes to be defined. If it is known that a quiet period is coming up, the length of the IMP could be adjusted to the length of the quiet period. Again, the IMP duration could be adjusted based on location within a superframe. In at least some embodiments, the quiet period would be a multiple of the "slot time" within the superframe.

As shown, the DPAAEL logic 512 provides an output (e.g., the average emission level or the peak emission level) to the threshold detection logic 514. If the average emission level is greater than a threshold value, the threshold detection logic 514 asserts an interference mitigation signal. Again, the interference mitigation signal is used to prevent or mitigate interference between a UWB-based device that implements the receiver 500 (e.g., the first UWB-based device 310A) and other devices.

In some embodiments, the complexity and/or power consumption of the interference detection performed by the receiver 500 can be reduced by reducing the FFT size. For example, instead of using the FFT 510 (a 128-point FFT in some embodiments), the receiver 500 could implement a separate 32-point FFT for the interference detection. Reducing the size of the FFT used for the interference detection provides a coarser estimate, but the estimate may be sufficient if interference is correlated or repeated over a few tones.

FIG. 6 illustrates a block diagram of interference mitigation logic 600 in accordance with embodiments of the disclosure. In some embodiments, the interference mitigation logic 600 is part of a UWB-based device's transceiver (e.g., the transceiver 312A) and enables prevention or mitigation of interference between a UWB-based device and other devices (e.g., the 802.11(a)-based device). As an example, the interference mitigation logic 600 is described as part of the transceiver 312A previously described.

As shown, the interference mitigation logic 600 comprises dynamic frequency selection logic 602 coupled to power control logic 604. The dynamic frequency selection logic 602 is responsive to an interference mitigation signal (1) (e.g., output from one of the receivers 400, 450, 500) and causes the UWB transceiver 312A to shift transmission from one frequency band to another frequency band (away from the frequency of interfering signal). The shift could be to a higher frequency band or a lower frequency band and would be determined by the capabilities of the UWB devices involved in the communication. For example, if interference is detected in UWB frequency band 4, but not in UWB frequency band 5, the dynamic frequency selection logic 602 may direct the UWB transceiver 312A to transmit signals in the UWB frequency band 5 instead of UWB frequency band 4. Alternatively, if interference is detected in UWB frequency band 5, but not in UWB frequency band 4, the dynamic frequency selection logic 602 may direct the UWB transceiver 312A to transmit signals in the UWB frequency band 4 instead of UWB frequency band 5.

Rather than cause the associated UWB transceiver to shift to another frequency band, the dynamic frequency selection logic 602 could cause the transceiver 312A to insert notches (wedges) into a UWB frequency band that experiences interference. The notches reduce the usable bandwidth of a UWB frequency band, but would enable the remaining bandwidth to be used for UWB signal transmission. Again, if the interference to a UWB frequency band is caused by an 802.11(a)-based device, the notch could be sized at approximately 20 MHz (the bandwidth of each 802.11(a) channel as shown in FIG. 2A) plus a few MHz on each side of the notch. Since each UWB frequency band has a bandwidth of approximately 528 MHz, inserting notches of approximately 20 MHz is acceptable in some embodiments.

In some embodiments, the dynamic frequency selection logic 602 can direct the transceiver 312A to shift to another frequency band, to drop a frequency band, or to insert notches into a frequency band. If both of these techniques are available to the transceiver 312A, some embodiments may be configured to shift frequency bands before inserting notches into a frequency band. In such embodiments, inserting notches into a frequency band is implemented if shifting frequency bands is no longer a viable option. Alternatively, if both of these techniques are available to the transceiver 312A, some embodiments may be configured to insert notches into a frequency band before shifting frequency bands. In such embodiments, shifting frequency bands is implemented if inserting notches into a frequency band is no longer a viable option. In any of these embodiments, the measured interference or the path loss can be used to determine whether to shift bands, to drop a band, or to insert a notch.

The dynamic power control logic 604 is responsive to an interference mitigation signal (2) (e.g., output from one of the receivers 400, 450, 500) and causes the UWB transceiver 312A to adjust the power level of UWB signals being transmitted. In some embodiments, the power level of UWB signals has an upper limit that is estimated based on a path loss as in Equation (1).

$$\text{Path loss} = P_{TX, MAX} - P_{INT, UWB} \tag{1}$$

In Equation (1), $P_{TX, MAX}$ is the maximum power at the non-UWB transmitter and $P_{INT, UWB}$ is the measured interference at the UWB receiver. In some embodiments, $P_{TX, MAX}$ is predetermined for 802.11(a) devices depending on the frequency channel. In such case, a value for $P_{TX, MAX}$ can be extracted by the dynamic power control logic 604 from a table or other database after the frequency channel associated with an interfering signal has been identified. The frequency channel information could be provided by the interference mitigation signal (2). Alternatively, the value for $P_{TX, MAX}$ can be estimated based on the peak emission level determined by the DPAAEL logic (430 or 512). Also, a value for $P_{INT, UWB}$ can be determined by averaging the emission level of an interfering signal received by the transceiver 312A using the DPAAEL logic 430 or 512 as previously described. Accordingly, both the values for $P_{TX, MAX}$ and $P_{INT, UWB}$ can be provided to the dynamic power control logic 604 using the interference mitigation signal (2). The value of the path loss described in Equation (1) provides an estimate for the maximum amount of power with which a UWB-based device can transmit signals without interfering with a non-UWB device that was previously detected.

In some embodiments, only the dynamic frequency selection logic 602 operates. In alternative embodiments, only the dynamic power control logic 604 operates. In still other embodiments, both the dynamic frequency selection logic 602 and the dynamic power control logic 604 operate together. In such embodiments, the operation of the dynamic frequency selection logic 602 and the dynamic power control logic 604 can be prioritized. For example, in some embodiments, the dynamic frequency selection logic 602 operates first and later, as needed, the dynamic power control logic 604 operates. Alternatively, in some embodiments, dynamic power control logic 604 operates first and later, as needed, the dynamic frequency selection logic 602 operates.

FIG. 7 illustrates a method 700 in accordance with embodiments of the disclosure. As shown, the method 700 comprises determining if a non-UWB device signal interferes with a UWB frequency band (block 702). If a UWB device can transmit signals on another frequency band (determination block 704), the method 700 comprises configuring the UWB device to transmit signals on another frequency band (block 706). If the UWB device cannot transmit signals on another frequency band (determination block 704), a determination is made whether a path loss of the non-UWB device is greater than a threshold amount (block 708). As previously described, in some embodiments, the path loss is equal to the maximum power transmission level at the non-UWB device minus the interference level detected at UWB device. If the path loss is greater than a threshold amount (determination block 708), the method 700 adjusts (e.g., decreases) a transmission power level of the UWB device to mitigate interference with the non-UWB device (block 710). Otherwise, if the path loss is less than a threshold amount (determination block 708), a notch is inserted into a UWB transmission band for UWB signal transmission (block 712). As shown, the method 700 is repeatable and dynamic. In some embodiments, the UWB device is configured in a default setting and adjusts as needed according to the method 700. If interference from the non-UWB device ends, the adjustments to the frequency band and/or the transmission power level are no longer needed. In this case, any default settings that were previously affected by the non-UWB device can be restored.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A device for wireless communication, comprising:
   a receiver configured to receive wireless signals in accordance with a first wireless communication protocol within at least one predetermined frequency band;
   a transmitter configured to transmit wireless signals in accordance with the a first wireless communication protocol within the at least one frequency band;
   interference detection logic coupled to the receiver, the interference detection logic is configured to wirelessly detect signals causing interference with transmissions of a second communication protocol within the at least one frequency band; and
   interference mitigation logic coupled to the detect interference logic and the transmitter, wherein the interference detection logic provides continual updates to the interference mitigation logic and wherein the interference mitigation logic responds by implementing all of techniques selectively inserting a notch into a frequency band, shifting transmission to another frequency band, dropping a frequency band from a sequence of frequency bands used for transmission, and adjusting a transmission power level.

2. The device of claim 1 wherein the techniques cause the transmitter to adjust a default setting, the default setting being a frequency band used for transmission and a transmission power level.

3. The device of claim 1 wherein the techniques cause the transmitter to perform an operation of shifting transmission from a first frequency band to a second frequency band using a hopping sequence of frequency bands within sequence of frequency bands without the dropped frequency band.

4. The device of claim 1 wherein adjusting a transmission power level includes a decrease in the transmission power level.

5. The device of claim 4 wherein the transmitter decreases the transmission power level based on a maximum transmission power level of an interfering signal and a measured interference level at the device.

6. The device of claim 1 wherein the interference detection logic detects signals transmitted in accordance with the second communication protocol within the at least one frequency band by correlating samples of a received signal with samples of a known packet preamble.

7. The device of claim 1 wherein the detect interference logic detects interfering signals by specifying an adjustable interference monitoring period (IMP), averaging a level of an incoming signal in the at least one frequency band and comparing the level to a threshold value.

8. The device of claim 1 wherein the interference detection logic comprises a Fast Fourier Transform (FFT), the FFT being smaller in size than an FFT used by the receiver to decode incoming signals.

9. A method for mitigating interference between an Ultra WideBand (UWB) device communicating in accordance with a Ultra WideBand (UWB) protocol and an non-Ultra WideBand UWB device communicating in accordance with an non-Ultra WideBand UWB protocol, wherein the Ultra WideBand (UWB) and non-Ultra WideBand UWB protocols utilize at least one overlapping frequency channel, the method comprising:

averaging a level of an incoming signal in the frequency channel over at least one user specified programmable interference monitoring period (IMP)

comparing the level to a threshold value;

if the frequency channel is being used by the non-Ultra WideBand UWB device, mitigating interference in the frequency channel comprising:

selectively inserting a notch into a frequency band;

dropping the frequency band from a sequence of frequency bands used for transmission;

adjusting a transmission power level; and shifting transmission to another frequency band using a frequency sequence of frequency bands without the dropped frequency band.

10. The method of claim 9 wherein adjusting the transmission power level comprises decreasing the transmission power level of the Ultra WideBand (UWB) device based on a calculated path loss associated with a signal communicated by the non-Ultra WideBand UWB device in the frequency channel.

11. The method of claim 9, wherein the IMP is adjusted based on location within a superframe.

12. The method of claim 9, wherein the level is an emission level and the average is taken across a plurality of IMPS.

13. The method of claim 9, wherein the level is an energy level and the average is taken in each of a plurality of frequency bins over one IMPs.

14. A device for wireless communication, comprising:

a receiver including a first FFT configured to decode wireless signals received in accordance with a first wireless communication protocol within at least one predetermined frequency band;

interference detection logic coupled to the receiver including a second FFT smaller in size than the first FFT and configured to detect signals causing interference that are being transmitted in accordance with a second communication protocol within the at least one frequency band;

interference mitigation logic coupled to the interference detection logic and configured to mitigate the interference; and a transmitter configured to transmit wireless signals in accordance with the first wireless communication protocol within the at least one frequency band, wherein the interference mitigation logic hierarchically implements adjusting a frequency band used for transmission and adjusting a transmission power level to mitigate the interference, wherein adjusting the frequency band used may include any one of or all of selectively inserting a notch into a frequency band, shifting transmission to another frequency band, and dropping a frequency band from a sequence of frequency bands used for transmission, and adjusting the transmission power level includes decreasing the transmission power level based on a maximum transmission power level of the interfering signal and a measured level of the interference.

15. The device of claim 14, wherein the first FFT is a 128-point FFT and the second FFT is a 32-point FFT.

* * * * *